(12) United States Patent
Mizuno et al.

(10) Patent No.: US 6,248,711 B1
(45) Date of Patent: Jun. 19, 2001

(54) METHOD OF TREATING WET PAINT SPRAY BOOTH

(75) Inventors: Keisuke Mizuno; Masahiro Horiuchi; Takao Mogami, all of Tokyo; Mitsuo Nakajima, Toyota, all of (JP)

(73) Assignees: Kurita Water Industries Ltd., Tokyo; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/698,268

(22) Filed: Oct. 30, 2000

Related U.S. Application Data

(62) Division of application No. 09/466,806, filed on Dec. 20, 1999.

(51) Int. Cl.[7] .............................. C11D 1/38; C11D 1/645
(52) U.S. Cl. .......................... 510/507; 510/504; 118/326
(58) Field of Search .................................. 510/504, 507; 118/326

(56) References Cited

U.S. PATENT DOCUMENTS

| | | | |
|---|---|---|---|
| 4,790,954 | * 12/1988 | Burba et al. | 252/315.5 |
| 5,409,630 | * 4/1995 | Lysy et al. | 252/174.23 |
| 5,473,033 | * 12/1995 | Kuo et al. | 526/307 |
| 5,773,706 | * 6/1998 | Wesley et al. | 44/266 |

* cited by examiner

Primary Examiner—Gregory Delcotto
(74) Attorney, Agent, or Firm—Kanesaka & Takeuchi

(57) ABSTRACT

In a method of treating a wet paint spray booth, the sepiolite alone or further accompanying the cationic polymer or the amphoteric metal compound is added. The wet paint spray booth treating agent and a method of treating a wet paint spray booth improve the effect of reduction in tackiness and decrease the load of agents to prevent the corrosion of furnishings. The sepiolite is a fibrous mineral containing chain structures having lots of micropores so that the sepiolite can reduce the tackiness of the paint due to reaction with the particles of the paint in such a manner to adsorb the particles in the micropores thereof. Since both the particles of the paint and the particles of the sepiolite are negatively charged, when the cationic polymer or the amphoteric metal compound is added in combination with the sepiolite, the electrical repulsion is reduced so that the particles of the paint become easy to be adsorbed to improve the effect of the reduction in the tackiness.

19 Claims, 1 Drawing Sheet

METHOD OF TREATING WET PAINT SPRAY BOOTH

CROSS REFERENCE TO RELATED APPLICATION

This is a divisional patent application of Ser. No. 09/466,806 filed on Dec. 20, 1999 pending.

FIELD OF THE INVENTION

This invention relates to method of treating a wet paint spray booth. Particularly, this invention relates to a method of treating a wet paint spray booth with using a wet paint spray booth treating agent for diminishing tackiness of paint in circulating water to be sprayed for collecting the surplus paint and preventing the paint from adhering and fixing to an interior of the wet paint spray booth.

BACKGROUND OF THE INVENTION AND RELATED ART STATEMENT

In a painting process of an automotive industry, yield of paint sprayed to an automobile body is generally from 60 to 80% and 40 to 20% of the sprayed paint constitutes a surplus paint to be removed in a subsequent process. The surplus paint sprayed excessively is usually collected in a wet paint spray booth by water washing and the washing water is circulated for re-use.

In the wet paint spray booth, since the surplus paint collected in the washing water has high tackiness, it adheres to a water-film panel, a piping system and a nozzle, and seriously degrades the efficiency of water washing. Moreover, the greater part of the surplus paint settles to the bottom of the booth pit and the bottom of the circulation pit in the spray booth, and the settled paint hardens into a rubbery state with elapse of time to take much time and labor for removal thereof.

For the solution of problems described above, a paint spray booth treating agent as follows has been be added to the washing water:

1) alkali including NaOH or KOH
2) amphoteric metal salts including Zn salt
3) cationic polymers and metal salts, and
4) bentonite (montmorillonite, hectorite)

It is known that sepiolite is added to waste water including oily matters and then the water is subjected to solid-liquid separation. However it is unknown to add sepiolite to the wet paint spray booth treating agent.

Among the conventional wet paint spray booth treating agents mentioned above, the effect of the alkalis for the reduction in the tackiness is not enough. The amphoteric metal salts and the cationic polymers require to be added in large amounts so that concentration of the salts is increased to cause corrosion of materials, The effect of the bentonite for the reduction in the tackiness is not enough so that a large amount of the cationic polymer is required to be added simultaneously.

Japanese patent publication 10-140045 discloses a paint composition capable of removing a toxic substance from a coated article. The paint composition contains a powdery or finely particular activated carbon and at least one kind of an activated carbon to which a toxic substance remover is stuck such as an amine compound or titanium oxide and a powdery or finely particular porous material such as sepiolite or zeolite. W093/02147 (entered into Japanese phase and published as Toku hyohei 6-509371) discloses an agent for removing tackiness of paint which comprises an inorganic aluminum compound and an organic polymer comprising a quaternary nitrogen atom.

OBJECT AND SUMMARY OF THE INVENTION

It is an object of the present invention to solve conventional problems described above and to provide a method of treating a wet paint spray booth with using a wet paint spray booth treating agent which can effectively reduce the tackiness and decrease the load of the agents so that corrosion is prevented.

The wet paint spray booth treating agent of the present invention comprises sepiolite.

The wet paint spray booth treating agent of the present invention may further comprise at least one of cationic polymer and amphoteric metal compound.

In the method of treating a wet paint spray booth of the present invention, sepiolite and at least one of the cationic polymer and amphoteric metal compound are added into circulating water of the wet paint spray booth.

Details of the effect of the wet paint spray booth treating agent of the present invention for the reduction in the tackiness is supposed as follows.

The sepiolite is water-containing magnesium silicate having a chemical formura $Mg_8Si_{12}O_{30}(OH)_4(OH_2)_4 \cdot 8H_2O$. The sepiolite is a fibrous mineral containing chain structures having lots of micropores so that the sepiolite can reduce the tackiness of the paint due to adsorption of the paint particles into the micropores thereof.

Since both the particles of the paint and the particles of the sepiolite are negatively charged, when the cationic polymer or the amphoteric metal compound is used in combination with the sepiolite, the electrical repulsion is reduced so that the paint particles become easy to be adsorbed to the sepiolite particles whereby reducing the tackiness of the paint particles.

DETAILED DESCRIPTION OF THE PREFERRED EMBODIMENTS

Figure 1:
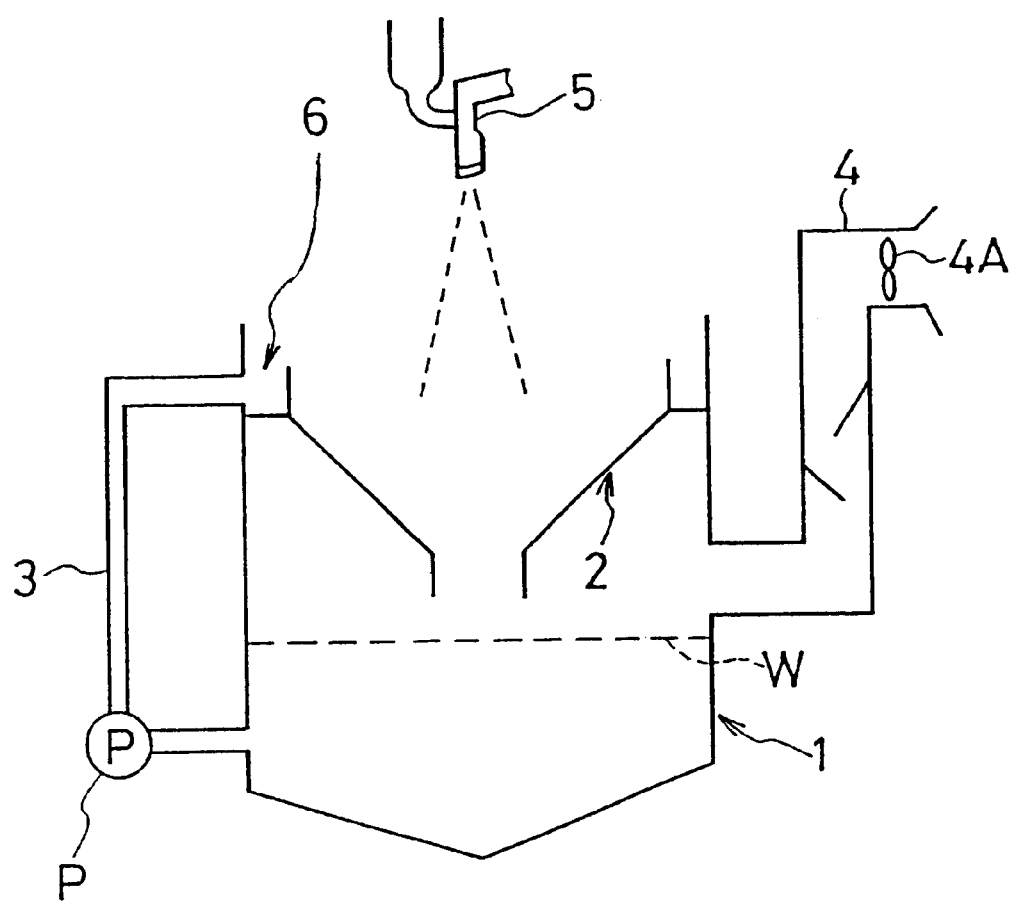
FIG. 1 is a schematic cross sectional view illustrating a test device used in examples.

The present invention will now be described in more detail.

In the present invention, sepiolite to be used may be a naturally produced clay mineral. The natural sepiolite may be refined which is commercially available. From the view point of the effect of the reduction in the tackiness, particles of the sepiolite is preferably fibrous to have a fiber length of less than 50 $\mu$m, particularly less than 10 $\mu$m.

The cationic polymer to be added with the sepiolite may have a molar weight of more than 1000, preferably in a range of thousands to hundreds thousands. The cationic polymer may be at least one of dimethyldiallylammonium chloride, the condensate of alkylamine and epichlorohydrin, ethyleneimine, the condensate of alkylene dichloride and polyalkylenepolyamine, the condensate of dicyandiamide and formalin, DAM (homopolymer or copolymer of dimethylaminoethylmethacrylate) and the like.

The amphoteric metal compound, may be at least one of PAC (polyaluminum chloride), aluminum sulfate, polyaluminum hydroxychloride, aluminum compound including pseudoboehmite alumina sol (AlO(OH)), iron compound including ferric chloride and zinc compound including zinc chloride and the like.

The type of the wet paint spray booth being applied with the wet paint spray booth treating agent of the present invention is not restricted, i.e. it may be either dispersion type or floating type. The sepiolite alone or further in combination with at least one of the cationic polymer and the amphoteric metal compound may be added into the circulating water to become a predetermined concentration. The treating agent adheres to the surplus paint to reduce the tackiness thereof, and the agent is discharged out of the circulating system along with the sludge of the paint during the sludge separating process. The agent is supplemented to the system in an amount which is discharged.

As adding amount of the sepiolite becomes larger, the particles of the paint become finer to improve the effect of the reduction of the tackiness. The concentration of the sepiolite in the circulating water is preferable to be 1 ppm or more, particularly 10 ppm or more, more particularly 500 ppm or more.

The preferable concentration of the sepiolite depends on the type of the wet paint spray booth as follows.

1) When the wet paint spray booth is of the dispersion type where the wet paint spray booth employs the circulating water comprising homogeneously suspended sludge and a part of which is separated by a separator such as a centrifugal dehydrator to recover SS (suspended substances).

In this case, the wet paint spray booth treating agent of the present invention is preferable to be added to the circulating water so that the concentration of the sepiolite becomes 50 ppm or more preferably between 100 and 500 ppm to reduce the tackiness and to disperse the particles. In this case, since the sepiolite adheres to the surplus paint and discharged accompanied with SS recovered by the separator, the sepiolite is preferable to be supplemented by continuous injection or batch injection in an amount of 0.1 ppm by weight or more, particularly in a range of 1 to 5% by weight based on the weight of the solid content of the surplus paint which is fed to the circulating water.

When the wet paint spray booth treating agent of the present invention is applied to the wet paint spray booth of the dispersion type, the sludge is effectively recovered and the water content of the recovered sludge becomes sufficiently low.

2) When the wet paint spray booth is of the floating type.

The wet paint spray booth of the floating type allows the circulating water to have a little more tackiness than that of the dispersion type. The sepiolite is accordingly preferable to be added so that the concentration thereof is 10 ppm or more, particularly in a range of 50 to 200 ppm in the circulating water.

In this case, the sepiolite is preferable to be supplemented by continuous injection or batch injection in an amount of 0.1 ppm by weight or more, particularly in a range of 0.5 to 2% by weight based on the weight of the solid content of the surplus paint which is fed to the circulating water.

When the cationic polymer is used in combination with the sepiolite, the cationic polymer is preferable to be added in an amount expressed as active principle of 0.01 to 20% by weight, particularly 0.5 to 10% by weight based on the amount of the sepiolite. The polymer is preferable to be comprised in such a manner to take the colloidal equivalent as 0.001 to 1 meq/liter to the circulating water, particularly as 0.002 to 0.5 meq/liter to the circulating water.

When the cationic polymer is added in an amount below the aforementioned range, the effect obtained by combination with the sepiolite is not enough. When the cationic polymer is added in an amount exceeding the aforementioned range, the effect of the reduction in the tackiness of the paint becomes poor.

When an amphoteric metal compound is used in combination with the sepiolite, the amphoteric metal compound is preferable to be added in an amount expressed as the metal oxide of 0.01 to 10% by weight, particularly 1 to 10% by weight based on the amount of the sepiolite.

When the amphoteric metal compound is added in an amount below the aforementioned range, the effect obtained by combination with the sepiolite becomes not enough. When the amphoteric metal compound is added in an amount exceeding the aforementioned range, the system including the booth and pipes becomes susceptible to corrosion because of the rise in strength of the salts in the circulating water.

The way of adding the sepiolite is not restricted, i.e. the sepiolite may be added in either form of the powder as it is or the suspension containing about 0.1 to 10 wt. % sepiolite.

When both of the cationic polymer and the sepiolite are added, they may be added either separately or in the form of the mixture. When the cationic polymer and the sepiolite are mixed each other in advance to be added to the circulating water, it is preferable that the sepiolite is firstly incorporated in a certain volume of water and then, after 1 minute or more, preferably 20 to 30 minutes elapsed and after the sepiolite is sufficiently dispersed to increase the tackiness, the cationic polymer is added to prepare the mixed liquid. While, when the cationic polymer is firstly added into the liquid and then the sepiolite is added, the resulting liquid is generally poor in the effect of the reduction in the tackiness of the circulating water.

When both of the sepiolite and the amphoteric metal compound are added to the circulating water, they are preferable to be added separately. When the mixture of the sepiolite and the amphoteric metal compound which are mixed in advance each other is added, the effect of the reduction in the tackiness is low.

All of the sepiolite, the cationic polymer and the amphoteric metal compound may be added to the circulating water.

In the present invention, besides the sepiolite, the cationic polymer and the amphoteric metal compound, many kinds of polymers having a large molar weight including anionic and nonionic polymers, for example polyacrylamide and its partial hydrolyzate, acrylic polymer and methacrylic polymer etc. may be added to the circulating water to enhance the aggregation and the solid-liquid separation of the sludge of the paint.

An alkali agent including sodium hydroxide, sodium carbonate, potassium hydroxide or potassium carbonate may also be added to the circulating water to neutralize the circulating water and prevent corrosion of the system.

Examples and Comparative Examples

The present invention will now be described more specifically referring to examples and comparative examples but the present invention is not limited to the following examples.

Examples 1 through 7, Comparative Examples 1 through 6

Using a test device shown in FIG. 1, effects for each kind of agents were tested.

In FIG. 1, a reference numeral 1 designates a pit, 2 is a water film plate, 3 is a circulating water pipe line having a circulating water pump P, 4 is an exhaust cylinder having an exhaust blower 4A and W is a water level. 5 is a spray gun disposed above the water film plate 2 for blowing the paint. 6 is an agent adding section.

Tests were conducted by using the illustrated washing device having a washing water capacity of 50 liters wherein the circulating water flowed at a rate of 100 liter/min. The washing water was prepared by adding the agents shown in Table 1 in amounts as shown in Table 1. The tests were carried out in such a way that intercoating materials used in the automotive factories were blown at a rate of 15 g/min for 2 minutes from the spray gun 5 and, then, touched with fingers to evaluate the tackiness of the paint based on the following criteria. The results of the evaluation are shown in Table 1.

Criteria

X: Identical with the raw paint, easy to adhere to the finger

Δ: Slightly reduced in the tackiness as compared with the raw paint, less easy to adhere to the finger ◯: Practically eliminated in the tackiness, free of adhesion to the finger 5) solids in the washing water after use can be separated and removed at a high separating efficiency to maintain the clarity of the circulating washing water at a high level.

Then, treatment for the paint booth can be conducted with an extreme industrial advantage.

Especially, the combination of the sepiolite and the cationic polymer or the amphoteric metal compound can exceedingly improve the effect of the reduction in the tackiness. In this case, a very small amount of the cationic polymer or the amphoteric metal compound is sufficient so that the rise of strength of the salts can be restrained to prevent the corrosion of the system.

What is claimed is:

1. A method of treating a wet paint spray booth comprising a step of adding sepiolite to circulating water for the wet paint spray booth.

TABLE 1

|  |  | Agents*1 | | | | | |
|---|---|---|---|---|---|---|---|
|  |  | Clay mineral | | Cationic polymer | | Amphoteric metal compound | |  |
|  |  | Kind*2 | Amount | Kind*3 | Amount | Kind | Amount | Evaluation |
| Example | 1 | Sepiolite | 200 | — | 0 | — | 0 | Δ |
|  | 2 | Sepiolite | 200 | — | 0 | PAC | 1(0.5) | Δ~◯ |
|  | 3 | Sepiolite | 200 | — | 0 | PAC | 2(1) | ◯ |
|  | 4 | Sepiolite | 200 | A | 1(0.5) | — | 0 | Δ~◯ |
|  | 5 | Sepiolite | 200 | A | 2(1) | — | 0 | ◯ |
|  | 6 | Sepiolite | 200 | B | 1.5(0.75) | — | 0 | Δ~◯ |
|  | 7 | Sepiolite | 200 | B | 3(1.5) | — | 0 | ◯ |
| Comparative | 1 | Bentonite | 200 | — | 0 | — | 0 | X |
| Example | 2 | Bentonite | 200 | — | 0 | PAC | 2(1) | X |
|  | 3 | Bentonite | 200 | A | 4(2) | — | 0 | Δ |
|  | 4 | — | 0 | — | 0 | PAC | 15 | X |
|  | 5 | — | 0 | A | 15 | — | 0 | X |
|  | 6 | — | 0 | B | 15 | — | 0 | X |

*1: The additive amount denotes the concentration (mg/liter) of the active principle in the circulating water. The amphoteric metal compound is expressed as $Al_2O_3$. The amount between parentheses such as (1), (0.75) or (0.5) denotes a percentage (%) of the amount of the active principle based on the amount of the clay mineral.
*2: The sepiolite is Miraclay ® P-80V of Ohmi Mining Co. Ltd., having a fiber length of less than 2 μm. The bentonite is Neokunibond (trade mark) of Kunimi Co. Ltd.
*3: The polymer "A" is Zeta-ace ® C301 of Kurita Water Industries Ltd., consisting of a condensation of alkylamine and epichlorohydrin. The polymer "B" is kurifix ® CL 611 of Kurita Water Industries Ltd., consisting of a condensation of alkylene dichloride and polyalkylenepolyamine.

As apparent from the above results, the wet paint spray booth treating agent and the method of the treating a wet paint spray booth according to the present invention can obtain the remarkable effect of the reduction in the tackiness without the corrosion of the system.

Therefore by the treating agent and the treating method according to the present invention, 1) clogging in the nozzle due to the deposition of the paint to the piping system or the like can be prevented to maintain the water washing efficiency at a satisfactory level and facilitate the maintenance.

2) deterioration of the working environment by the clogging in the gas discharge system or the like can be prevented.

3) the paint sludge which deposits or floats in the booth pit or the like is not easily solidified and can be removed readily.

4) cleaning liquid waste can easily be put to solid-liquid separation and the waste water can be treated easily.

2. A method of treating a wet paint spray booth as claimed in claim 1, wherein cationic polymer is further added to the circulating water.

3. A method of treating a wet paint spray booth as claimed in claim 1, wherein amphoteric metal compound is further added to the circulating water.

4. A method of treating a wet paint spray booth as claimed in claim 1, wherein the wet paint spray booth is a dispersion wet paint spray booth, and the concentration of the sepiolite in the circulating water is equal to or more than 50 ppm.

5. A method of treating a wet paint spray booth as claimed in claim 4, wherein the concentration of the sepiolite in the circulating water is in a range of 100 to 500 ppm.

6. A method of treating a wet paint spray booth as claimed in claim 1, wherein the wet paint spray booth is a dispersion wet paint spray booth, and the adding rate of the sepiolite based on the weight of solids content of surplus paint is equal to or more than 0.1% by weight.

7. A method of treating a wet paint spray booth as claimed in claim 6, wherein the adding rate of the sepiolite based on the weight of solids content of the surplus paint is in a range of 1 to 5% by weight.

8. A method of treating a wet paint spray booth as claimed in claim 1, wherein the wet paint spray booth is a floating wet paint spray booth and the concentration of the sepiolite in the circulating water is equal to or more than 10 ppm.

9. A method of treating a wet paint spray booth as claimed in claim 8, wherein the concentration of the sepiolite in the circulating water is in a range of 50 to 200 ppm.

10. A method of treating a wet paint spray booth as claimed in claim 1, wherein the wet paint spray booth is of a floating type, and the adding rate of the sepiolite based on the weight of solids content of surplus paint is equal to or more than 0.1% by weight.

11. A method of treating a wet paint spray booth as claimed in claim 10, wherein the adding rate of the sepiolite based on the weight of solids content of the surplus paint is in a range of 0.5 to 2% by weight.

12. A method of treating a wet paint spray booth as claimed in claim 2, wherein the rate of the cationic polymer to the sepiolite is in a range of 0.01 to 20% by weight when expressed as an active principle.

13. A method of treating a wet paint spray booth as claimed in claim 2, wherein the rate of the cationic polymer to the sepiolite is in a range of 0.5 to 10% by weight when expressed as an active principle.

14. A method of treating a wet paint spray booth as claimed in claim 2, wherein the cationic polymer is added in such a manner that a colloid value of the colloid equivalent falls in a range of 0.001 to 1 meq/liter.

15. A method of treating a wet paint spray booth as claimed in claim 2, wherein the cationic polymer is added in such a manner that a value of the colloid equivalent falls in a range of 0.002 to 0.5 meq/liter.

16. A method of treating a wet paint spray booth as claimed in claim 3, wherein the rate of the amphoteric metal compound added to the sepiolite is in a range of 0.01 to 10% by weight when expressed as a metal oxide, based on the amount of the sepiolite.

17. A method of treating a wet paint spray booth as claimed in claim 3, wherein the rate of the amphoteric metal compound added to the sepiolite is in a range of 1 to 10% by weight when expressed as a metal oxide, based on the amount of the sepiolite.

18. A method of treating a wet paint spray booth as claimed in claim 2, wherein the sepiolite and the cationic polymer are mixed in advance to be added to the circulating water, and wherein the sepiolite is firstly dispersed in a certain volume of water and then the cationic polymer is supplied thereinto to prepare a liquid, and the liquid is added to the circulating water.

19. A method of treating a wet paint spray booth as claimed in claim 3, wherein the sepiolite and the amphoteric metal compound are separately added to the circulating water.

* * * * *